United States Patent [19]

Whipple, III

[11] Patent Number: 5,144,840

[45] Date of Patent: Sep. 8, 1992

[54] VIBRATION DETECTOR AND METHOD FOR ROTATING SHAFT

[75] Inventor: Walter Whipple, III, Amsterdam, N.Y.

[73] Assignee: General Electric Company, Schenectady, N.Y.

[21] Appl. No.: 739,775

[22] Filed: Jul. 30, 1991

Related U.S. Application Data

[63] Continuation of Ser. No. 370,667, Jun. 23, 1989, abandoned.

[51] Int. Cl.[5] .............................................. G01H 1/10
[52] U.S. Cl. ..................................................... 73/660
[58] Field of Search ................ 73/660, 661, 579, 659, 73/650

[56] References Cited

U.S. PATENT DOCUMENTS

| | | | |
|---|---|---|---|
| 3,376,733 | 4/1968 | Trimble et al. | 73/659 |
| 3,686,956 | 8/1972 | Simpkin et al. | 73/660 |
| 3,733,892 | 5/1973 | Rennick | 73/660 |
| 3,841,149 | 10/1974 | Edwin et al. | 73/659 |
| 3,885,420 | 5/1974 | Wolfinger | 73/650 |
| 4,007,630 | 2/1977 | Noda | 73/659 |
| 4,148,222 | 4/1979 | Wolfinger | 73/650 |
| 4,322,976 | 4/1982 | Sisson et al. | 73/659 |
| 4,425,798 | 1/1984 | Nogai et al. | 73/660 |
| 4,478,082 | 10/1984 | Sato et al. | 73/660 |
| 4,614,117 | 9/1986 | Taniguti | 73/660 |

FOREIGN PATENT DOCUMENTS 2266148  1/1975  France ................................ 73/660

OTHER PUBLICATIONS

"Early Diagnosis of Dynamic Unbalances and of Misalignments in Large Turbogenerators", Chapis et al., (Energia Nucleare, vol. 23, No. 5, 1976).
"Intstrumentatiepalclcet Voor Turbinebewaking-"-Polytechnisch Tijdschrift: Geluid en Trilling, vol. 34, No. 4, 1979.
"Diagnosing Rotating Equipment Ills" by C. A. Eubanks, (Machine Design, vol. 52, No. 1 (1980 Jan.)).

Primary Examiner—Hezron E. Williams
Assistant Examiner—Rose M. Finley
Attorney, Agent, or Firm—Marilyn Glaubensklee; James C. Davis, Jr.; Paul R. Webb, II

[57] ABSTRACT

Apparatus for detecting abnormal vibration in a shaft, such as a rotating crucible holder drive shaft of a crystal puller, has a pair of sensors disposed 90 degrees with respect to each other. The signals are high pass filtered and added together, then low pass filtered and full wave rectified to operate an alarm and strip recorder. A method for detecting vibration in a shaft comprises sensing vibrations in the shaft, filtering the sensed signals, and rectifying the filtered signals.

13 Claims, 2 Drawing Sheets

VIBRATION DETECTOR AND METHOD FOR ROTATING SHAFT

This was made with Government support under DAAL 03-86-C-0022 awarded by U.S. Army Research Office. The government has certain rights in this invention.

This application is a continuation of application Ser. No. 07/370,667, filed Jun. 23, 1989, now abandoned.

BACKGROUND OF THE INVENTION

The present invention relates to a vibration detector for a rotating shaft, and more particularly, to such a detector used with a Czochralski-type crystal puller.

In the Czochralski-type crystal puller, a melt of the crystal material is disposed in a heated crucible, which is attached to a rotating shaft. Surrounding the heater is an insulating jacket called "heater furniture", and the whole apparatus is mounted on a baseplate. A seed crystal is placed in the melt and pulled up, and some of the melt solidifies on the seed in crystallographic alignment therewith. This solidified portion is called the "boule". When the crystal to be formed is GaAs, a very high pressure inert gas must be used to prevent the As from vaporizing. The high pressure causes the gas to be a good thermal conductor. To prevent loss of heat through the gas, which would occur if the gas goes between the heater furniture and the crucible, tight tolerances are used between the rotating crucible and the heater furniture, in particular an insulating cap thereof. However, then the crucible will sometimes make contact with the cap. If the contact is hard enough, it will cause the crucible to break out into a rotary oscillation. This oscillation can cause failure to gain control of crystal growth, and therefore termination of the pull with shorter than desired crystal length, twinning or dislocations in the crystal before the desired length is achieved, and breaking of the boule off the seed and its falling into melt. If boule breakage occurs, it can fracture the crucible. This often causes catastrophic damage to the puller, and since the leaking melt is conductive and hot, this can result in a destroyed heater and even a partially melted baseplate. Further, all items that come in contact with the melt (except the crucible) become contaminated waste.

Presently it can only be determined if the crucible is in a rotational oscillation by observing it on a video monitor. This is dependent on sufficient heat in the crystal chamber to adequately light the crucible, e.g., at least about 4 hours after start of heat-up. It is also necessary to have an operator present at the time of the oscillation and act promptly (typically within a few seconds) to correct it.

It is therefore an object of the present invention to have a warning system for vibration of rotating shaft that provides clear and early warning of the vibration.

SUMMARY OF THE INVENTION

Apparatus in accordance with the invention for detecting vibration of a shaft comprises at least a first non-contacting proximity sensor adapted to be disposed proximate the shaft; filtering means coupled to said sensor; and AC detection means coupled to said filtering means.

A method in accordance with the invention for detecting vibration of a shaft comprises sensing vibration in the shaft without contacting the shaft to provide a sensor signal; filtering said sensor signal; and AC detecting the filtered signal.

DETAILED DESCRIPTION

Figure 1:
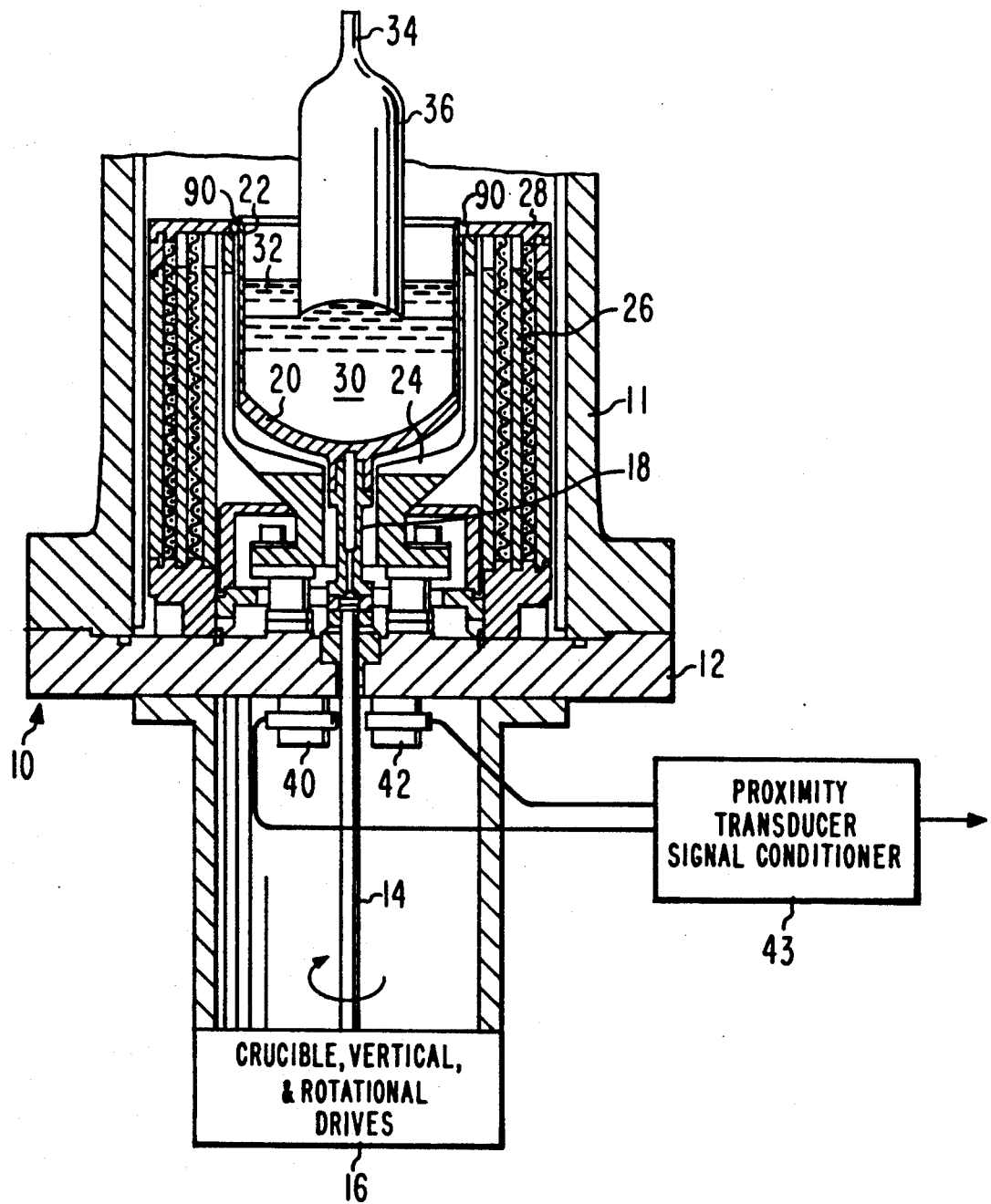
FIG. 1 shows a partly cross-sectional and partly block diagram of the apparatus in accordance with the invention.

As shown in FIG. 1 a crucible puller apparatus, generally designated 10, is largely conventional and can be Model 358 made by Cambridge Instruments, Cambridge, U.K., and thus will be only briefly described. A cylindrical sidewall 11 overlies a base plate 12 to form with a top (not shown) a pressure chamber. Plate 12 has a drive shaft 14 extending therethrough that is driven at its bottom end by drive apparatus 16. Apparatus 16 comprises both a motor (not shown) for rotation of shaft 14 and another motor and worm gear (neither shown) for vertical linear motion of shaft 14. Coupled to the upper end of shaft 14 is crucible support rod hardware 18, which in turn supports a graphite crucible holder 20. Disposed within holder 20 is a $BNO_3$ crucible 22 of between about 0.015 to 0.020 inches (0.0381 to 0.0508 cm) thickness. Disposed around crucible holder 20 is an electrical resistance heater 24, while disposed around heater 24 is heater furniture 26 comprising alternating layers of graphite and graphite blankets. An insulating furniture cap 28 overlies heater furniture 26 and is considered a portion thereof. The clearance gap 90 between cap 28 and holder 20 is very small to prevent an inert gas (not shown), e.g., Ar, $N_2$, etc., at very high pressure from flowing therebetween and causing loss of heat. This inert gas is used at a high pressure to prevent vaporization of product reagents, e.g., Ga, As, etc. Within crucible 20 is a melt 30 of a semiconductor material, e.g., GaAs, while above melt 30 is a protective layer 32 of, e.g., $B_2O$, to prevent contamination of melt 30 by any $O_2$ that may be present in the chamber. A seed crystal 34 of the product to be grown, e.g., GaAs, has grown from it a boule crystal 36.

In operation, the seed crystal 34 is rotated and simultaneously pulled up by apparatus (not shown) as the boule crystal 36 grows, which tends to lower the top level of melt 30. Simultaneously, apparatus 16 rotates drive shaft 14 in the opposite direction from that of crystals 34 and 36 and moves it up. This upward movement is to keep the top level of melt 30 at a constant level relative to heater 24, which has been found to be critical for good monocrystalline growth. However, due to the very small gap 90 between cap 28 and holder 20, binding can occur therebetween and hence eventually oscillation of drive shaft 14, with the negative results described above, e.g., damage to the crucible, the crystal, and the puller.

In accordance with the invention, two non-contacting proximity transducer probes 40 and 42 are located around drive shaft 14 just below base plate 12. Sensors or probes 40 and 42 can be of the eddy current type, i.e., coils, such as the 7200 series made by Bentley-Nevada Corp., Minden, Nev., or model KD 2400 made by Kaman Instrumentation Corp., Colorado Springs, Colo. Other types of non-contacting sensors, e.g., hysteresis, capacitance, photoranging, etc., can be used. In general, non-contacting sensors are used to limit motion pick up to that of shaft 14, and their output signals require less filtering and signal analysis to determine shaft abnormalities. Non-contacting sensors provide a DC output signal with a nominal AC component when shaft 14 is just rotating, and an additional AC signal when shaft 14 is also vibrating. The output signals from sensors 40 and 42 are applied to a signal conditioner 43 (described below).

Figure 2:
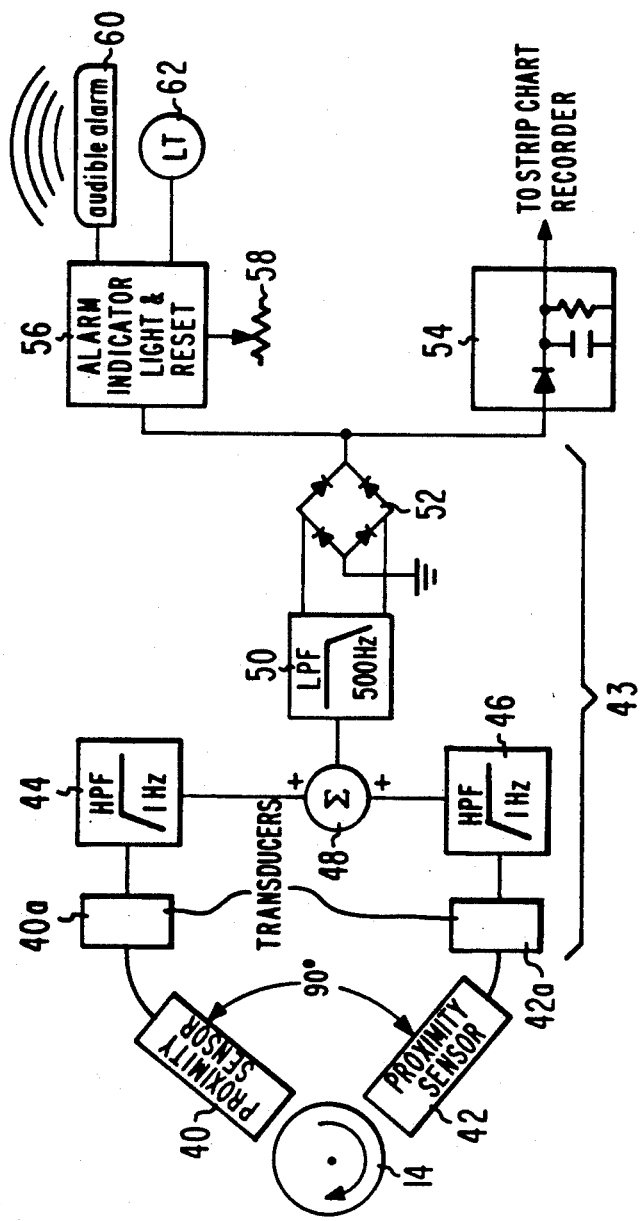
FIG. 2 shows a detail of a block used in FIG. 1.

As shown in FIG. 2, transducer sensors 40 and 42 are preferably disposed at a 90 degree angle with respect to one another. If there is binding between cap 28 and holder 20, there will be no change in the output signal from that transducer sensor which is at an angle of about 0 or 180 degrees from the binding point. Thus the 90 degree arrangement ensures an output signal from at least one transducer sensor. If desired, three or more transducer sensors at mutually equal angles can be used, or a single transducer sensor can be used to pick up vibrations, but it will not reliably pick up touching.

The analog signals from transducer sensors 40 and 42 are respectively applied to transducers 40a and 42a and then passed through one Hz high-pass cut off frequency filters 44 and 46, respectively, and are summed together in adder 48. In a particular embodiment, each of the filters 44 and 46 comprises a series input capacitor and the shunt input resistance of adder 48, and an additional two pole high pass filter with a 1 Hz cut off frequency in adder 48 for a total of three poles of high pass filtering. The filters 44 and 46 are used to eliminate the 0 to 30 RPM (DC to 0.5 Hz) normal noise of rotating drive shaft 14. The resulting signal from adder 48 is passed through a low-pass filter 50 of approximately 500 Hz cutoff to eliminate shaft pressure seal noise at a frequency of about 1.2 KHz caused by sequential stick and slip. In a particular embodiment, filter 50 comprises a 6 pole active modified Bessel filter for good pulse response. Details of designing such a filter can be found in "Transducer Interfacing Handbook" by Analog Devices Co., Norwood, Mass. This high frequency stick and slip does not cause the damage that the above described binding does because its frequency is well above the resonant frequency of the entire pulling apparatus. Further, a narrower pass band has been found sometimes useful, e.g., 70 to 200 Hz, and more particularly, 100 to 130 Hz. The lower of these frequencies can be used in the filters 44 and 46, while the higher of these frequencies can be used in filter 50. It will be appreciated that filters 44 and 50, and also 46 and 50, comprise a band pass filtering means. If desired, the output signals from transducers 40a and 42a can be directly added and the added signal passed through a band pass filter with the lower and upper cut off frequencies given above.

The output signal from filter 50 is then full wave rectified by AC detector or rectifier 52. A full wave rectifier is preferably used so that motion of shaft 14 in either direction can be detected although other types of rectifiers can be used. In a particular embodiment, rectifier 52 was an active rectifier. The output signal from rectifier 52 is a D.C. representation of crucible behavior and is applied to a peak detector 54 and from it to a chart recorder (not shown) for display. In a particular embodiment, wherein the chart recorder had a bandwith of 3 Hz, peak detector 54 had a time constant of 10 seconds. However, if the chart recorder has a wider bandwidth, then a lower time constant can be used. Further, peak detector 54 was of the active type.

The output signal from rectifier 52 is also applied to an alarm circuit 56. Low level D.C. (approximately 50 mv) from rectifier 52 represents normal crucible activity. Rapid increases in D.C. level are indications of abnormal crucible behavior. In the alarm circuit 56, if the full wave rectified D.C. voltage exceeds a preset trip point value determined by a potentiometer 58, a retriggerable monostabile multivibrator on-shot therein (not shown), turns on a resettable audible alarm 60 and light 62. If the fault was caused by a momentary contact, the alarm will sound for approximately one second, but the light will stay on until the operator resets it. In the event of a crucible oscillation, the alarm 60 and light indicator 62 will remain on until the fault, i.e., oscillation, is cleared and/or a reset switch (not shown) in alarm 56 has been pressed.

Figure 3:
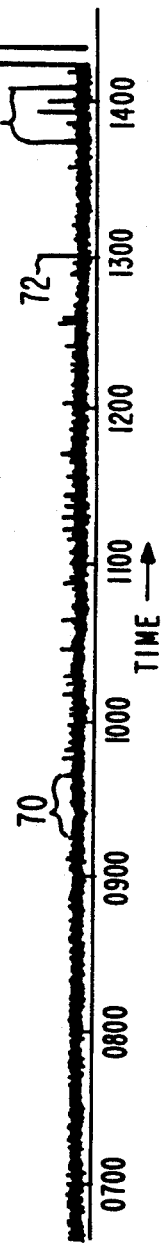
FIG. 3 shows a strip recorder output graph.

FIG. 3 shows a chart recorder output calibrated in 24 hour time. Up to about 0930 there is no binding. This is due to an initial alignment that is performed before the puller starts operation. After 0930 some binding takes place as indicated by spikes 70. As time passes, the spikes become larger with a particularly large spike 72 at 1300, thus indicating that the binding is becoming harder. After 1330, several large spikes 74 occur with a generally increasing amplitude. Finally, at about 1415, a very large continuous oscillation 76 occurs. An operator observing the oscillation 76 can clear the incipient fault by slowing down the rotation of shaft 14 and then bring it back up to normal rotational speed to resume the normal growth rate of boule 36. Usually when bringing shaft 14 back up to normal speed, the oscillation will not reoccur because the binding caused by grinding of cap 28 and/or holder 20 increases the tolerance therebetween.

It will be appreciated the many other embodiments are possible within the spirit and scope of the invention. For example, an AC detector, such as an AC voltmeter, can be coupled to the output of filter 50, or even directly to the output of adder 48, and the needle or digits of the voltmeter watched by the operator for a rising average value. This eliminates the need for elements 50 to 62 of FIG. 2.

What is claimed is:

1. Apparatus for detecting vibration of a rotating shaft in a Czochralski type crystal puller said apparatus comprising:
    a first non-contacting proximity sensor adapted to be disposed proximate to the rotating shaft in order to detect vibratory movement thereof;
    at least a second non-contacting proximity sensor similarly disposed at a predetermined angle with respect to the first sensor in order to detect vibratory movement of said rotating shaft;
    high pass filtering means coupled to each of said sensors;
    an adder coupled to each of said high pass filtering means;
    low pass filtering means coupled to said adder; and
    AC detection means coupled to said low pass filtering means.

2. The apparatus of claim 1 wherein said sensors are disposed at about a 90 degree angle with respect to each other.

3. The apparatus of claim 1 wherein said proximity sensor comprises an eddy current sensor.

4. The apparatus of claim 1 wherein said high pass and low pass filtering means cooperate to provide a bandpass of between about 1 Hz to 500 Hz.

5. The apparatus of claim 1 wherein said high pass and low pass filtering means cooperate to provide a bandpass of between about 70 Hz to 200 Hz.

6. The apparatus of claim 1 wherein said high pass and low pass filtering means cooperate to provide a bandpass of between about 100 Hz to 130 Hz.

7. The apparatus of claim 1 wherein said detection means comprises a full wave rectifier.

8. The apparatus of claim 1 further comprising an alarm circuit coupled to said detection means.

9. The apparatus of claim 1 further comprising a peak detector coupled to said detection means.

10. A method for detecting vibration of a rotating shaft in a Czocralski type crystal puller, said method comprising:

sensing vibration in the shaft with first sensing means adapted to provide a first sensor signal without contacting the shaft;

sensing vibration in said shaft with second sensing means adapted to provide a second sensor signal without contacting the shaft;

high pass filtering the respective sensor signals;

summing together said respective sensor signals in an adder means;

low pass filtering the summed signal; and

AC detecting the summed and filtered signal in order to identify vibrations endangering crystal growth.

11. The method of claim 10 wherein said detecting step further comprises full wave rectifying.

12. The method of claim 10 further comprising peak detecting the AC detected signal and displaying the peak detected signal.

13. The method of claim 10 further comprising providing an alarm signal when the AC detected signal exceeds a trip point selected to correspond to said endangering vibrations.

* * * * *